US009287027B2

(12) United States Patent
Miyao et al.

(10) Patent No.: US 9,287,027 B2
(45) Date of Patent: Mar. 15, 2016

(54) RARE EARTH METAL-BASED PERMANENT MAGNET

(75) Inventors: Yukimitsu Miyao, Saitama (JP); Tsutomu Nakamura, Osaka (JP)

(73) Assignee: HITACHI METALS, LTD., Tokyo (JP)

( * ) Notice: Subject to any disclaimer, the term of this patent is extended or adjusted under 35 U.S.C. 154(b) by 947 days.

(21) Appl. No.: 12/990,341

(22) PCT Filed: May 14, 2008

(86) PCT No.: PCT/JP2008/058873

§ 371 (c)(1),
(2), (4) Date: Oct. 29, 2010

(87) PCT Pub. No.: WO2009/139055

PCT Pub. Date: Nov. 19, 2009

(65) Prior Publication Data

US 2011/0037549 A1 Feb. 17, 2011

(51) Int. Cl.

| | |
|---|---|
| ***H01F 1/057*** | (2006.01) |
| ***B32B 15/04*** | (2006.01) |
| ***C22C 9/00*** | (2006.01) |
| ***C22C 13/00*** | (2006.01) |
| ***H01F 41/02*** | (2006.01) |

(52) U.S. Cl.

CPC ................ *H01F 1/0577* (2013.01); *C22C 9/00* (2013.01); *C22C 13/00* (2013.01); *H01F 41/026* (2013.01); *Y10T 428/32* (2015.01); *Y10T 428/325* (2015.01)

(58) Field of Classification Search

None

See application file for complete search history.

(56) References Cited

U.S. PATENT DOCUMENTS

| | | | | |
|---|---|---|---|---|
| 6,606,019 | B1 * | 8/2003 | Ohashi | 335/302 |
| 2003/0052013 | A1 * | 3/2003 | Ando et al. | 205/296 |

(Continued)

FOREIGN PATENT DOCUMENTS

| | | |
|---|---|---|
| JP | 01-321610 | 12/1989 |
| JP | 8-154351 | 6/1996 |

(Continued)

OTHER PUBLICATIONS

International Search Report for International Application No. PCT/JP2008/058873 dated Aug. 12, 2008.

*Primary Examiner* — Mark Ruthkosky
*Assistant Examiner* — Lisa Chau
(74) *Attorney, Agent, or Firm* — Kratz, Quintos & Hanson, LLP

(57) ABSTRACT

An objective of the present invention is to provide a rare earth metal-based permanent magnet with improved adhesion properties. A rare earth metal-based permanent magnet of the present invention as a means for achieving the objective has a laminated plating film, and is characterized in that the plating film comprises as an outermost surface layer a SnCu alloy plating film having a film thickness in a range from 0.1 μm to 2 μm, the composition of the SnCu alloy plating film is 35 mass % or more but less than 55 mass % of Sn and the rest being Cu, and a base plating film having two or more layers including at least a Ni plating film and a Cu plating film which are formed as the lower layer under the SnCu alloy plating film, and among the base plating film, the Ni plating film is located just below the SnCu alloy plating film. A joined structure fabricated using the rare earth metal-based permanent magnet of the present invention exhibits favorable initial adhesion strength when combined with a silicone-based adhesive, and is less deteriorated in adhesion strength even after a moisture resistance test.

6 Claims, 2 Drawing Sheets

(56) References Cited

U.S. PATENT DOCUMENTS

| | | | | |
|---|---|---|---|---|
| 2004/0137162 | A1 * | 7/2004 | Kikui et al. | 427/443.1 |
| 2007/0269679 | A1 | 11/2007 | Niinae | |
| 2009/0035603 | A1 | 2/2009 | Niinae | |

FOREIGN PATENT DOCUMENTS

| | | | |
|---|---|---|---|
| JP | 2002-329627 | A1 | 11/2002 |
| JP | 2003-193273 | | 7/2003 |
| JP | 2003-257721 | A1 | 9/2003 |
| JP | 2006-179801 | A1 | 7/2006 |
| JP | 3972111 | | 6/2007 |
| JP | 2007-273503 | A1 | 10/2007 |
| JP | 2007-273556 | | 10/2007 |
| JP | 2007273503 | A * | 10/2007 |
| JP | 4033241 | | 11/2007 |
| JP | 2008-147642 | A1 | 6/2008 |

* cited by examiner

RARE EARTH METAL-BASED PERMANENT MAGNET

TECHNICAL FIELD

The present invention relates to a rare earth metal-based permanent magnet having a plating film. Specifically, it relates to a rare earth metal-based permanent magnet having a plating film improved in adhesion properties.

BACKGROUND ART

Rare earth metal-based permanent magnets such as R—Fe—B based permanent magnets (where R represents a rare earth element inclusive of Y) are used nowadays in various fields because of their high magnetic characteristics, and the demand is recently increasing.

However, since R—Fe—B based permanent magnets contain a highly reactive rare earth element: R, they are apt to be oxidized and corroded in ambient, and in the case they are used without applying any surface treatment, corrosion tends to proceed from the surface in the presence of small acidic or alkaline substance or water to generate rust, and this brings about the degradation and the fluctuation of magnetic characteristics. Moreover, in the case such a rusty magnet is embedded in a magnetic circuit and a like device, there is fear of scattering rust to contaminate peripheral components. In the light of the above circumstances, referring to Patent Literature 1 and the like, there have been disclosed rust preventive treatments of forming a Ni plating film, a Cu plating film, or a combination of both, as surface treatments of rare earth metal-based permanent magnets, and those methods have been widely employed in the art.

On the other hand, in the case of embedding a joined structure obtained by joining a rare earth metal-based permanent magnet having a Ni plating film at the outermost surface thereof with other member using an adhesive in various devices, it is required that the Ni plating film and the other member exhibit strong adhesion properties via the adhesive. However, due to the effect of the passivation film that is formed on the surface of the Ni plating film, there are cases in which the adhesion properties become inferior to that of a resin film or an aluminum film depending on the usages, which causes problematic adhesion failure.

In order to overcome this problem, Patent Literature 2 proposes a technique comprising pickling the surface of a Ni plating film with an organic carboxylic acid. This is an excellent technique for recovering the adhesion properties of a Ni plating film.

However, when the joined structure adhered by the method proposed in Patent Literature 2 is allowed to stand under a moisture resistance test, a decrease in the adhesion strength has been observed. In particular, a distinct decrease is observed in the case a silicone-based adhesive is used as the adhesive.

Patent Literature 3 and Patent Literature 4 disclose techniques comprising applying a single layer Cu plating or a single layer Ni plating on the surface of a magnet containing a rare earth element, followed by carrying out a Cu alloy plating, thereby obtaining a rare earth magnet having high magnetic characteristics and excellent corrosion resistance.

However, these patent literatures contain no considerations on the improvement of the adhesion properties, and have no disclosures on the constitution of the base plating film for improving the adhesion properties or on the composition of the Cu alloy film.

Patent Literature 1: JP-A-1-321610
Patent Literature 2: JP-A-2003-193273
Patent Literature 3: JP-A-2007-273503
Patent Literature 4: JP-A-2007-273556

DISCLOSURE OF THE INVENTION

Problems the Invention is to Solve

Numerous joined structures obtained by joining magnets with other members using adhesives are recently used in electrical equipments and wiring components for automobiles. Thus, it is required to guarantee long term reliability in the adhesion strength of such joined structures. Accordingly, it is required to warrant the adhesion strength, not only just after adhering the magnet with other member, but also during usage after transporting the joined structure after adhering under a relatively high temperature and high humidity environment such as in the case of a cargo by sea and the like. For instance, more cases are encountered nowadays which require setting a standard on the adhesion strength after subjecting the joined structure to a moisture resistance test (80° C.×90% RH) used for the electrical equipments, wiring components and the like.

Accordingly, an objective of the present invention is to provide a rare earth metal-based permanent magnet having a coating film having excellent corrosion resistance and which enables adhesion without deterioration in the adhesion strength even after it is subjected to an acceleration test such as a moisture resistance test and the like.

Means for Solving the Problems

In the light of the above circumstances, studies have been made on coating films which enables adhesion without deterioration in the adhesion strength even after it is subjected to an acceleration test such as a moisture resistance test and the like.

As a result, the present inventors have found that a magnet, having a SnCu alloy plating film of a predetermined composition and a predetermined thin film thickness provided thereon as the outermost surface layer, does not suffer deterioration in the adhesion strength even after being subjected to a moisture resistance test.

However, it has been also found that, because the SnCu alloy plating film is thin, it is apt to be influenced by the base coating film, and that there is fear that the desired adhesion strength cannot be achieved due to the surface irregularities of the magnet, if the surface roughness of the base coating film is large.

Thus, the present inventors have found that the above problem can be overcome by providing a multilayered plating film as abase coating film containing a Cu plating film having superior smoothness and a Ni plating film located just below the SnCu alloy plating film. The present invention has been accomplished based on those findings.

A rare earth metal-based permanent magnet according to the present invention, which is obtained based on the above findings, has a laminated plating film, and is characterized in that the plating film comprises as an outermost surface layer a SnCu alloy plating film having a film thickness in a range from 0.1 μm to 2 μm, the composition of the SnCu alloy plating film is 35 mass % or more but less than 55 mass % of Sn and the rest being Cu, and a base plating film having two or more layers including at least a Ni plating film and a Cu plating film which are formed as the lower layer under the SnCu alloy plating film, and among the base plating film, the Ni plating film is located just below the SnCu alloy plating film.

The following constitutions are proposed as further preferred embodiments.

A rare earth metal-based permanent magnet wherein the film thickness of the Cu plating film provided as one of the base plating films is in a range from 3 μm to 17 μm.

A rare earth metal-based permanent magnet wherein the film thickness of the Ni plating film provided as one of the base plating films is in a range from 2 μm to 8 μm.

Furthermore, a rare earth metal-based permanent magnet of the present invention is characterized in that a chemical conversion treatment film is further provided on the SnCu alloy plating film.

Moreover, a rare earth metal-based permanent magnet of the present invention is characterized in that it is ring-shaped.

Further, a joined structure of the present invention is a joined structure obtained by joining the above rare earth metal-based permanent magnet with other member via a silicone-based adhesive.

Effect of the Invention

According to the present invention, there is provided a rare earth metal-based permanent magnet having formed on the surface of the rare earth metal-based permanent magnet body a laminated plating film having two or more layers including at least a Ni plating film and a Cu plating film, with a SnCu alloy plating film formed further thereon; and a joined structure obtained by adhering the rare earth metal-based permanent magnet with other member using an adhesive can maintain high adhesion strength even after being subjected to a moisture resistance test.

EXPLANATION OF SYMBOLS

Figure 1:
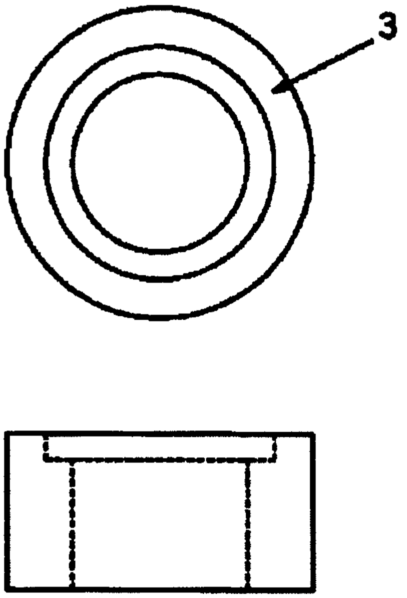
FIG. 1 It is a diagram showing an upper view and a side view of a jig for measuring an adhesion strength.

1 Yoke for measuring adhesion strength
2 Ring-shaped sintered magnet body
3 Jig for measuring adhesion strength

BEST MODE FOR CARRYING OUT THE INVENTION

A rare earth metal-based permanent magnet of the present invention is characterized in that it has a SnCu alloy plating film formed on a laminated base plating film which has two or more layers including at least a Ni plating film and a Cu plating film, and that the outermost surface layer of the plating film is the SnCu alloy plating film.

The base for the SnCu alloy plating film should have at least two or more layers of plating films. In the present invention, a combination containing a Ni plating film and a Cu plating film is employed to improve the corrosion resistance and the smoothness of the coating film.

By applying a Cu plating with superior smoothness and by forming thereon a Ni plating with high resistance against oxidation, a smooth and highly oxidation-resistant laminated coating film can be obtained as a base coating film for the SnCu alloy plating. By controlling the film thickness of the SnCu alloy plating film formed on the smooth and highly oxidation-resistant coating film in a very thin range, a SnCu alloy plating film can be obtained with few protrusions. When a magnet body having such a coating film is adhered to other member using an adhesive, high adhesion strength can be maintained free from spalling of the coating film which might be attributed to protrusions.

The effect of the rare earth metal-based permanent magnet having on the surface thereof a coating film improved in adhesion properties of the present invention is realized by taking advantage of the characteristics of each of the coating films laminated as a base above, and is thereby achieved only by the combination described above.

The present invention is described in further detail below.

The SnCu alloy plating film has a composition of 35 mass % (22.3 atomic %) or more but less than 55 mass % (39.5 atomic %) of Sn, preferably, in a range from 40 mass % to 50 mass %. If the content of Sn is less than 35 mass %, the film is prone to oxidation and corrosion due to the increase in Cu content ratio. If the film contains 55 mass % or more of Sn, the hardness of the film decreases abruptly due to the increase in Sn content ratio to result in the film prone to flaws.

The SnCu alloy plating film having the above composition is very brittle, and tends to spall inside the film or generate protrusions on the surface thereof with the increase of the film thickness. The protrusions are prone to cause problems by spalling during handling, and, furthermore, being trigger of the spalling of the film in a large extent. The spalling of the coating film and the generation of the protrusions are concerned when the film thickness exceeds 2 μm. Thus, the film thickness of the SnCu alloy plating film is set to 2 μm or less. Moreover, since the SnCu alloy is non-magnetic, in order to effectively utilize the intrinsic magnetic characteristics of the rare earth metal-based permanent magnet, the film thickness of the SnCu alloy plating film is preferably set as thin as possible. The improvement of the adhesion properties of the SnCu alloy plating film can be achieved with a film thickness of 0.1 μm or more, and more preferably, 0.2 μm or more.

Since the SnCu alloy plating film of the present invention is thin, the surface roughness of the obtained SnCu alloy plating film resembles that of the laminated plating film provided as the base; thus, it becomes rough and tends to generate protrusions on the SnCu alloy plating film in the case the surface roughness of the base plating film is high. Accordingly, a base plating film is preferably smooth. The smoothness of the base plating film is preferably a surface roughness $R_{max}$ in a range form 0.5 to 15 μm, more preferably, from 0.5 to 10 μm, and most preferably, from 0.5 to 5 μm.

The base plating film of the SnCu alloy plating film is preferably of the type and film thickness which enable to maintain the smoothness.

Any plating film may be selected so long as it is a film with high smoothness. However, among them, a Cu plating film is generally adopted, because there are a wide variety of plating solutions for the Cu plating and it easily provides a smooth film.

A Cu plating film is apt to be oxidized and discolored in ambient. Accordingly, applying a Ni plating to the Cu plating film is preferred, because it prevents the deterioration in the corrosion resistance of the Cu plating film due to discoloration and oxidation, and because the SnCu alloy plating film provides the improvement of corrosion resistance. Thus, the Ni plating film is provided just below the SnCu alloy plating film.

The film thickness of the Ni plating film that is formed on the Cu plating film is preferably such a film thickness that is capable of maintaining the smoothness of the base Cu plating film while preventing oxidation of the Cu plating film.

In the case of forming a three-layered film comprising Ni plating-Cu Plating-Ni plating, as an example of the base plating film for the SnCu alloy plating film, the preferred range of the film thickness is given below.

It is preferred to form in the sequence of, referring from the surface side of the magnet body, Ni (provided at a film thickness between the lower limit with which the magnet body is covered with the plating film and the upper limit with which the film can be formed without disadvantages in industrial production), Cu (film thickness being in a range from 3 to 17 μm), and Ni (film thickness being in a range from 2 to 8 μm).

If the film thickness of the Cu plating film is less than 3 μm, it cannot sufficiently smooth the irregular structure of the base Ni plating film located under the Cu plating film; if the film thickness exceeds 17 μm, the total thickness of the laminated plating film becomes too thick, it is disadvantageous in industrial production.

If the film thickness of the Ni plating film that is provided as the uppermost layer (the surface layer of the three-layered film) of the base plating film is less than 2 μm, the rust preventive effect to protect the Cu plating film that is located just below thereof from corrosion and oxidation becomes low; if the film thickness exceeds 8 μm, the surface irregularities of the Ni plating film increases with growing the film to increase the surface roughness.

Next, in the case of forming a two-layered film comprising Cu plating-Ni plating, as the base coating film for the SnCu alloy plating film, the preferred range of the film thickness is given below.

It is preferred to form in the sequence of, referring from the surface side of the magnet body, Cu (film thickness being in a range from 3 to 17 μm) and Ni (film thickness being in a range from 2 to 8 μm).

If the film thickness of the Cu plating film is less than 3 μm, the surface structure of the magnet body having been roughened in a pretreatment for plating cannot be smoothed by the Cu plating; if the film thickness exceeds 17 μm, the total thickness of the laminated plating film becomes too thick, it is disadvantageous in industrial production.

If the film thickness of the Ni plating film that is provided as the uppermost layer (the surface layer of the two-layered film) of the base plating film is less than 2 μm, the rust preventive effect to protect the Cu plating film that is located just below thereof from corrosion and oxidation becomes low; if the film thickness exceeds 8 μm, the surface roughness increases due to the structure intrinsic to the Ni plating film.

In the present invention, the film thickness of the plating film can be measured at the adhesion plane.

The film thickness ratio of the SnCu alloy plating film and the Cu plating film (SnCu alloy plating film thickness/Cu plating film thickness) is preferably in a range from 0.006 to 0.67, and more preferably, from 0.011 to 0.67. If the ratio is less than 0.006, the film thickness of the SnCu alloy plating film is too thin, there is fear that it cannot contribute to the improvement of adhesion properties. If the ratio exceeds 0.67, the film thickness of the SnCu alloy plating film is too thick, there is fear that the magnetic characteristics is deteriorated or the SnCu alloy plating film is easy spalled off. Further, the film thickness ratio of the Ni plating film and the Cu plating film (Ni plating film thickness/Cu plating film thickness) is preferably in a range from 0.12 to 2.67, and more preferably, from 0.3 to 1.0. If the ratio is less than 0.12, the film thickness of the Ni plating film is too thin, there is fear that it cannot exhibit the effect of improving the corrosion resistance. If the ratio exceeds 2.67, the film thickness of the Ni plating film is too thick, there is fear that the smoothing effect of the Cu plating film is decreased.

Any plating bath known in the art may be used for the SnCu alloy plating, so long as it is a plating bath having a solution composition capable of forming the coating film whose composition is in a range described in Claim 1. There can be mentioned a pyrophosphate bath, a cyanide bath, an acidic bath, and the like. A technique for a SnCu alloy plating without using extremely poisonous cyanide is disclosed in JP-A-2004-10907, and such a bath is preferably used.

Any desired conditions under which the SnCu alloy plating film can be controlled to have the composition and the film thickness in a range described in Claim 1 can be used as the conditions for the SnCu alloy plating.

Barrel plating and rack plating may be used arbitrarily as the plating method, however, in the case the magnet body to be plated is ring-shaped and electroplating is applied, preferred is rack plating. Because the electric current value flown to the outer diameter part and the inner diameter part of the ring can be easily controlled in rack plating, a plating film can be formed with uniform film thickness on the outer diameter part and the inner diameter part. In the case the SnCu alloy plating is carried out by electroplating, the current density can be selected arbitrarily depending on the type of the plating solution and the plating method such as barrel plating, rack plating, and the like, but preferably in a range from 0.1 $A/dm^2$ to 10 $A/dm^2$, and more preferably, from 0.5 $A/dm^2$ to 5 $A/dm^2$.

A chemical conversion treatment can be applied to the SnCu alloy plating film using trisodium phosphate and the like. Concerning the chemical conversion treatment conditions, for instance, a rare earth metal-based permanent magnet having a SnCu alloy plating film as the outermost surface layer may be immersed in a trisodium phosphate solution at a concentration in a range from 10 g/L to 30 g/L under a solution temperature of 20° C., followed by rinsing and drying. By applying such a chemical conversion treatment, discoloration of the SnCu alloy plating film can be suppressed without deteriorating the adhesion properties. Otherwise, the chemical conversion treatment may be carried out using phosphoric acid. A solution diluted in a range from 1 to 80 g/L as reduced to phosphate ions is heated in a range from 30 to 60° C., and a rare earth metal-based permanent magnet having a SnCu alloy plating film as the outermost surface layer is immersed therein for about in a range from 30 seconds to 5 minutes to generate a chemical conversion film.

By applying an activation treatment using an acid to the base plating film before carrying out the SnCu alloy plating, the adhesion properties between the base plating film and the SnCu alloy plating film can be further improved to achieve stable production. An alkaline treatment has a degreasing effect but the activation is insufficient; moreover, since an alkali cannot be easily rinsed with water and is apt to remain as a residue on the surface, special attention is required to prevent the separation from occurring between the SnCu alloy plating film and the base plating film. Hydrochloric acid or sulfuric acid is preferred as an acid. The concentration of hydrochloric acid is preferably in a range from 10 vol % to 50 vol %. If the concentration is lower than 10 vol %, sufficient activation cannot be achieved. If the concentration exceeds 50 vol %, discoloration (surface degradation) of the Ni plating film and the Cu plating film may occur, and there is fear of deteriorating the adhesion properties.

In the case of using sulfuric acid, the concentration range may be the same as that of hydrochloric acid.

Further, as acids other than hydrochloric acid and sulfuric acid, favorably used are organic acids such as oxalic acid, phosphoric acid, and the like. In particular, in the case of using a pyrophosphate-based plating solution for a SnCu alloy plating, when phosphoric acid, polyphosphoric acid, or the like is used as an acid for the activation, even if the plating step is carried out directly without rinsing with water after the acid activation, there is not a considerably influence on the SnCu alloy plating solution that is used in the later step, and a SnCu alloy plating film having favorable adhesion properties with the base plating film can be formed.

A preferred mode of the base plating film for the SnCu alloy plating film is described below.

At the time of forming a Cu plating film as the base plating film, a plating bath can be selected from a pyrophosphate bath, a sulfate bath, a cyanide bath, an electroless plating bath, or a plating bath containing a chelating agent for Fe ions as described in Japanese Patent No. 3972111 and Japanese Patent No. 4033241. A Cu electroplating using a pyrophosphate bath is superior in electric conductivity, flexibility, and malleability, and exhibits excellent film coverage. Accordingly, the electroplating using a pyrophosphate bath can be favorably used for plating ring-shaped products. The film coverage as denoted herein is an ability of plating to cover raw materials, for instance, the ability of plating to adhere to a portion with lower current density, such as a concave part of an object to be plated or the inner diameter part of a ring-shaped magnet.

Moreover, the electroplating using a pyrophosphate bath exhibits excellent smoothness free from cell structure, thereby maintaining smoothness of the SnCu alloy plating provided thereon.

The Cu electroplating described in U.S. Pat. No. 3,972,111 and U.S. Pat. No. 4,033,241 can provide a bright and an extremely dense film directly on an R—Fe—B based rare earth magnet.

In the case of carrying out an electroplating using a Cu pyrophosphate bath, an electroconductive protective layer is preferably provided as the base thereof. Since a Cu pyrophosphate bath contains free Cu ions in large quantity, if an R—Fe—B based magnet is directly immersed in the pyrophosphate bath, there is fear that a substitution plating reaction occurs between the electrically base metal such as Fe which constitutes the surface of the magnet and the electrically noble Cu, thereby forming on the surface of the magnet a Cu coating film having poor adhesion properties. Thus, a Ni electroplating film, which is capable of forming directly a plating film having superior adhesion properties on the surface of an R—Fe—B based magnet body, is preferred as the base for the plating film formed using a Cu pyrophosphate bath. In a Ni electroplating, the composition of the plating solution can be readily managed and the film thickness of the coating film can be easily controlled. A Cu electroplating using a cyanide bath can be effected, but safety precautions must be taken.

A base plating is not always necessary in the case of employing the methods described in U.S. Pat. No. 3,972,111 and U.S. Pat. No. 4,033,241. By blending a chelating agent having a high chelate stability constant for Fe ions supplied by the plating solution, a copper plating film having superior adhesion properties can be formed on the surface of a rare earth magnet.

In particular, when an electroplating is applied to a ring-shaped magnet, less electric current is flown into an inner diameter part of the ring-shaped magnet; this results in a tendency that a thinner plating film is formed on the inner diameter part, and, furthermore there are cases that the adhesion properties of the coating film is impaired due to the corrosion caused by the plating solution. However, by using the above plating solution, the deterioration in adhesion strength attributed to the spalling of the plating film from the magnet body can be favorably suppressed, because there is no corrosion of the magnet body caused by the plating solution.

A Ni plating can be applied by an electroplating using a plating bath such as a Watts bath, a sulfamate bath, a neutral bath, and the like. Furthermore, an electroless plating, which provides films with highly uniform film thickness, can be effected.

Plating methods for a Ni plating and a Cu plating can be properly selected from the methods such as barrel plating, rack plating, and the like depending on the shape, weight, and dimension of the object to be plated.

However, when the rare earth metal-based permanent magnet is ring-shaped and is subjected to an electroplating, preferred is to employ rack plating. In rack plating, the electric current flown to the outer diameter part and the inner diameter part of the ring can be easily controlled, and a plating film can be formed with uniform film thickness on the outer diameter part and the inner diameter part. In the case an electroplating is selected, the current density can be set depending on the type of the plating solution and the plating method, but preferably in a range from 0.1 A/dm$^2$ to 10 A/dm$^2$, and more preferably, from 0.5 A/dm$^2$ to 5 A/dm$^2$.

Arbitrary methods can be utilized as the pretreatment for plating a magnet; usable are those selected from mixed acids of nitric acid with other acid, sulfuric acid, hydrochloric acid, organic acids, and the like; electrolytic etching can be selected as well.

The present invention can be applied to all types of known rare earth metal-based permanent magnets, so long as they are magnets that can be subjected to plating.

A rare earth metal-based permanent magnet has a very small linear expansion coefficient; for instance, in the case of an R—Fe—B based permanent magnet, the coefficient is $5\times10^{-6}$/° C. parallel to the c axis and $-1.5\times10^{-6}$/° C. perpendicular to the c axis. Accordingly, when a joined structure is fabricated by adhering the magnet with other member such as iron-based materials having a larger linear expansion coefficient (for instance, the linear expansion coefficient of iron is $12\times10^{-6}$/° C.) using an adhesive having a higher hardness, such as an epoxy-based adhesive, cracks may generate on the magnet during thermal hardening due to the stress generated by the difference in linear expansion coefficients. This phenomenon is particularly distinguished in the case a rotor for a motor is produced by inserting a yoke made of an iron-based material into the inner diameter part of an R—Fe—B based ring-shaped magnet and an adhesives is coated; that is, cracks generate on the magnet, because the iron-based material having a larger linear expansion coefficient expands when the adhesive is subjected to the thermal hardening. Silicone-based adhesives, which are adhesives having lower hardness, are widely utilized to cope with this problem.

Addition reaction type silicone-based adhesives, which thermally harden in a relatively short time, are widely used industrially. Less crack generation on the magnet occurs because the silicone-based adhesives absorb the stress. However, the adhesion strength of the joined structure produced by using a silicone-based adhesive abruptly decreases when it is brought in an environment of high temperature and high humidity, and in particular, the deterioration is distinguished for a rare earth metal-based permanent magnet having a Ni plating film as the outermost surface layer of the magnet body. The joined structure, which is obtained by adhering the rare earth metal-based permanent magnet having a SnCu alloy plating film as the outermost surface layer of the present invention with other member using a silicone-based adhesive, overcomes the problems described above; the deterioration in adhesion strength is small even after being subjected to a moisture resistance test and a stable adhesion strength is assured for a long term.

Furthermore, when the rare earth metal-based permanent magnet of the present invention is subjected to a moisture resistance test before adhering to fabricate a joined structure, the adhesion strength measured after adhering shows no deterioration in strength as compared with that not being subjected to the moisture resistance test.

The evaluation of wetting properties is used as an index for understanding the adhesion properties. The evaluation method comprises testing the wetting properties of the surface of a test specimen using a wetting tension test solution, and the adhesion properties are generally evaluated as being better with increasing value of this index. The rare earth metal-based permanent magnet of the present invention not only has no deterioration in adhesion strength when it is adhered with other member using an adhesive and subjected to the moisture resistance test, but also recovers easily the adhesion properties by a heat treatment even when the surface is oxidized before it is adhered with other member. The rare earth metal-based permanent magnet of the present invention was subjected to long term storage without adhering with other member to make the surface of the plating film have decreased wetting properties, and was then subjected to a heat treatment at 150° C. for 90 minutes. When the wetting properties of the above case was evaluated using a wetting tension test solution produced by Wako Pure Chemical Industries, Ltd., and it was confirmed that the index for evaluating the wetting properties was recovered from 40 mN/m before the heat treatment to 73 mN/m after the heat treatment. This fact shows that the rare earth metal-based permanent magnet of the present invention can further elongate the term for retaining the adhesion properties by applying a heat treatment.

A method for producing an R—Fe—B based permanent magnet by powder metallurgy method is described below as an example for producing a magnet body (magnet raw material) which constitutes the rare earth metal-based permanent magnet of the present invention. As the composition, there can be mentioned comprising R in a range from 24 mass % to 34 mass % (where R represents at least one type of rare earth element inclusive of Y, which includes at least one of Nd and Pr as the indispensable element), B in a range from 0.6 mass % to 1.8 mass %, and balance Fe, wherein the major components R, Fe, and B in total make 100 mass %. Fe may be partly substituted by Co, and the magnet may contain approximately 3 mass % or less of an additional element such as Al, Si, Cu, Ga, Nb, Mo, and W.

If the content of R is less than 24 mass %, the residual magnetic flux density $B_r$ and the coercive force $H_{cJ}$ may be deteriorated among the magnetic characteristics. If the content of R exceeds 34 mass %, the content of the phase rich in rare earth elements inside the sintered body increases so that the morphology coarsens, thereby resulting in deteriorated corrosion resistance. If the content of B is less than 0.6 mass %, the content of B which is necessary for forming the main phase, $R_2Fe_{14}B$ phase, falls short, thereby generating a soft magnetic $R_2Fe_{14}$ phase which results in a deteriorated coercive force. If the content of B exceeds 1.8 mass %, on the other hand, a non-magnetic phase rich in B increases so that the residual magnetic flux density $B_r$ is deteriorated.

Crushing is classified into coarse crushing and pulverization; coarse crushing is preferably carried out by using a stamp mill, a jaw crusher, a Brown mill, a disc mill, and the like, or hydrogen occlusion method. Pulverization is preferably carried out by using a jet mill, vibration mill, a ball mill, and the like. In any case, the crushing process is preferably effected in a non-oxidizing atmosphere using an organic solvent or an inert gas to prevent oxidation from occurring. The granularity after crushing is preferably in a range from 2 to 8 μm (F.S.S.S.). If the particle size is less than 2 μm, the activity of the magnetic powder results so high that the powder is easily oxidized. This also causes large deformation when sintered, and also impairs the magnetic characteristics. If the particle size exceeds 8 μm, the crystal grain size obtained after sintering increases, and this easily causes magnetization reversal which results in a deteriorated coercive force.

Molding is performed under a magnetic field. The magnetic field intensity is preferably 159 kA/m or higher, and more preferably, 239 kA/m or higher. If the magnetic field intensity is lower than 159 kA/m, the magnetic powder is insufficiently oriented, and the desired magnetic characteristics cannot be obtained. The molding pressure is preferably in a range from 0.5 to 2 ton/cm$^2$. If the molding pressure is lower than 0.5 ton/cm$^2$, the molding body easily undergoes breakage due to the low strength. If the molding pressure exceeds 2 ton/cm$^2$, the orientation of the magnetic powder is disturbed to impair the magnetic characteristics. The sintering is preferably carried out under vacuum or in an argon atmosphere in the temperature range from 1000 to 1150° C. If the sintering temperature is lower than 1000° C., it brings an insufficiently sintered product falling short of required density and thereby reduced in magnetic characteristics. If the sintering temperature exceeds 1150° C., oversintering causes deformation or deterioration in magnetic characteristics.

Heat treatment and processings are carried out after sintering. Processings can be performed before the heat treatment.

EXAMPLES

The present invention is described in further detail below by making reference to Examples. However, it should be understood that the present invention is not limited thereto.

<Preparation of a Magnet>

Example 1

An Nd—Dy—Fe—Al—B based sintered magnet body comprising $(Nd,Dy)_2(Fe)_{14}B$-type intermetallic compound as the main phase was produced by a known method. This sintered magnet body yielded magnetic characteristics at room temperature of $B_r$=1.2 T (12 kG), $H_{cJ}$=1989 kA/m (25 kOe), and $(BH)_{max}$=280 kJ/m$^3$ (35 MGOe). Subsequently, the sintered magnet body was processed into a rectangular shape of 30 mm×15 mm×3 mm, and was subjected to barrel polishing.

After polishing, the sintered magnet body was immersed in an aqueous rust preventive agent, and was heated to about 60° C. to dry. The specimen thus obtained was subjected to a first pretreatment using 5 vol % of nitric acid and a second pretreatment using a mixed acid comprising 10 vol % of hydrogen peroxide and 25 vol % of acetic acid as the pretreatment for plating, and then a Ni—Cu—Ni three-layered plating film was formed in the following order.

[First Layer: Ni Plating Film]

Plating bath: Watts bath (containing 300 g/L of Ni sulfate, 50 g/L of Ni chloride, and 50 g/L of boric acid)

Bath temperature: 50° C.

Current density: 1 A/dm$^2$

Film thickness: 3 μm

Rinsed with Water After Forming the Film

[Second Layer: Cu Plating Film]

Plating bath: A Cu pyrophosphate bath (containing 80 g/L of Cu pyrophosphate, 30 g/L of metallic Cu, 300 g/L of potassium pyrophosphate, 2 ml/L of ammonia, and 1 ml/L of a brightening agent ("Pyrotop PC", product of Okuno Chemical Industries Co., Ltd.))
Bath temperature: 55° C.
Current density: 1 A/dm$^2$
Film thickness: 7 μm
Rinsed with Water After Forming the Film
[Third Layer: Ni Plating Film]
Plating bath: Watts bath (containing 300 g/L of Ni sulfate, 50 g/L of Ni chloride, 50 g/L of boric acid, and 10 mL/L of a brightening agent (saccharine base))
Bath temperature: 50° C.
Current density: 1 A/dm$^2$
Film thickness: 5 μm
Rinsed with Water After Forming the Film A SnCu alloy plating film was formed under the conditions below on the surface of the sintered magnet body having provided thereon the Ni—Cu—Ni three-layered plating film formed in the manner above, to thereby obtain the rare earth metal-based permanent magnet of the present invention.

[SnCu Alloy Plating Film]
Plating bath: containing 20 g/L of stannous pyrophosphate, 10 g/L of Cu pyrophosphate, 180 g/L of potassium pyrophosphate, and additives such as a brightening agent, a cationic surfactant, a surface tension controlling agent, and a bath stabilizer
Bath temperature: 20° C.
Current density: 1 A/dm$^2$
Film thickness: 1 μm
Rinsed with Water and Dried After Forming the Film The composition of the SnCu alloy plating film was found to be Cu:Sn=55:45 mass %.

Example 2

A rare earth metal-based permanent magnet having a multilayered plating film was produced in the same manner as in Example 1 except for changing the film thickness of the SnCu alloy plating film to 0.1 μm.

Example 3

A rare earth metal-based permanent magnet having a multilayered plating film was produced in the same manner as in Example 1 except for changing the film thickness of the SnCu alloy plating film to 0.2 μm.

Example 4

A rare earth metal-based permanent magnet having a multilayered plating film was produced in the same manner as in Example 1 except for changing the film thickness of the SnCu alloy plating film to 2 μm.

Example 5

A rare earth metal-based permanent magnet having a multilayered plating film was produced in the same manner as in Example 1 except for changing the film thicknesses of the Ni film, Cu film, and Ni film constituting the Ni—Cu—Ni three-layered plating film to 5 μm, 12 μm, and 8 μm, respectively; and for changing the film thickness of the SnCu alloy plating film to 0.1 μm.

Example 6

A rare earth metal-based permanent magnet having a multilayered plating film was produced in the same manner as in Example 1 except for changing the film thicknesses of the Ni film, Cu film, and Ni film constituting the Ni—Cu—Ni three-layered plating film to 5 μm, 12 μm, and 8 μm, respectively; and for changing the film thickness of the SnCu alloy plating film to 0.2 μm.

Example 7

A rare earth metal-based permanent magnet having a multilayered plating film was produced in the same manner as in Example 1 except for changing the film thicknesses of the Ni film, Cu film, and Ni film constituting the Ni—Cu—Ni three-layered plating film to 1 μm, 3 μm, and 2 μm, respectively; and for changing the film thickness of the SnCu alloy plating film to 2 μm.

Example 8

A rare earth metal-based permanent magnet having a multilayered plating film was produced in the same manner as in Example 1, and the resulting magnet was subjected to chemical conversion treatment by immersing it in 10 g/L of trisodium phosphate solution for 3 minutes, followed by rinsing with water and drying.

Example 9

A rare earth metal-based permanent magnet having a multilayered plating film was produced in the same manner as in Example 1 except for adjusting the composition of the SnCu alloy plating solution to obtain a coating film having a composition of Cu:Sn=65:35 mass %.

Example 10

A rare earth metal-based permanent magnet having a multilayered plating film was produced in the same manner as in Example 1 except for adjusting the composition of the SnCu alloy plating solution to obtain a coating film having a composition of Cu:Sn=60:40 mass %.

Example 11

A rare earth metal-based permanent magnet having a multilayered plating film was produced in the same manner as in Example 1 except for adjusting the composition of the SnCu alloy plating solution to obtain a coating film having a composition of Cu:Sn=50:50 mass %.

Example 12

A rare earth metal-based permanent magnet having a multilayered plating film was produced in the same manner as in Example 1 except for adjusting the composition of the SnCu alloy plating solution to obtain a coating film having a composition of Cu:Sn=47:53 mass %.

Example 13

A rare earth metal-based permanent magnet having a multilayered plating film was produced in the same manner as in Example 1 except for adjusting the composition of the SnCu alloy plating solution to obtain a coating film having a composition of Cu:Sn=46:54 mass %.

Example 14

A N—Cu—Ni three-layered plating film was formed in the same manner as in Example 1, followed by immersion in 10 vol % of sulfuric acid and rinsing with water.

A SnCu alloy plating film was formed under the same conditions as in Example 1 on the surface of the sintered magnet body having provided thereon the N—Cu—Ni three-layered plating film formed in the manner above, to thereby obtain the rare earth metal-based permanent magnet of the present invention.

Example 15

A N—Cu—Ni three-layered plating film was formed in the same manner as in Example 1, followed by immersion in 10 vol % of hydrochloric acid and rinsing with water.

A SnCu alloy plating film was formed under the same conditions as in Example 1 on the surface of the sintered magnet body having provided thereon the N—Cu—Ni three-layered plating film formed in the manner above, to thereby obtain the rare earth metal-based permanent magnet of the present invention.

Example 16

A N—Cu—Ni three-layered plating film was formed in the same manner as in Example 1, followed by immersion in polyphosphoric acid having its pH adjusted to 1.3 by dilution with water. Subsequently, a SnCu alloy plating film was formed thereon under the same conditions as in Example 1 except for applying the SnCu alloy plating without rinsing with water, to thereby obtain the rare earth metal-based permanent magnet of the present invention.

Example 17

A Cu plating film having a film thickness of 17 μm was formed on the surface of the sintered magnet body prepared in Example 1 according to the method described in U.S. Pat. No. 4,033,241, and a Ni plating film was formed on the surface of the Cu plating film under the conditions below.

[Second Layer: Ni Plating Film]

Plating bath: Watts bath (containing 300 g/L of Ni sulfate, 50 g/L of Ni chloride, 50 g/L of boric acid, and 10 mL/L of a brightening agent (saccharine based))

Bath temperature: 50° C.

Current density: 1 A/dm$^2$

Film thickness: 5 μm

Rinsed with Water After Forming the Film

A SnCu alloy plating film was formed under the conditions below on the surface of the sintered magnet body having provided thereon the Cu—Ni two-layered plating film formed in the manner above, to thereby obtain the rare earth metal-based permanent magnet of the present invention.

[SnCu Alloy Plating Film]

Plating bath: containing 20 g/L of stannous pyrophosphate, 10 g/L of Cu pyrophosphate, 180 g/L of potassium pyrophosphate, and additives such as a brightening agent, a cationic surfactant, a surface tension controlling agent, and a bath stabilizer Bath temperature: 20° C.

Current density: 1 A/dm$^2$

Film thickness: 1 μm

Rinsed with Water and Dried After Forming the Film

The composition of the SnCu alloy plating film was found to be Cu:Sn=55:45 mass %.

Reference Example

A rare earth metal-based permanent magnet having a Ni—Cu two-layered plating film was produced by applying the pretreatment in the same manner as in Example 1 to the same sintered magnet body used in Example 1, forming the first Ni plating film layer in the same manner as in Example 1, and forming the second Cu plating film layer in the same manner as in Example 1 except for changing the film thickness to 12 μm.

A SnCu alloy plating film was formed under the same conditions as in Example 1 on the surface of the sintered magnet body having provided thereon the N—Cu two-layered plating film formed in the manner above, to thereby obtain a rare earth metal-based permanent magnet having a multilayered plating film.

Comparative Example 1

A rare earth metal-based permanent magnet having a multilayered plating film was produced in the same manner as in Example 1 except for changing the film thickness of the SnCu alloy plating film to 4 μm.

Comparative Example 2

A rare earth metal-based permanent magnet having a multilayered plating film was produced in the same manner as in Example 1 except for changing the film thickness of the SnCu alloy plating film to 3.5 μm.

Comparative Example 3

A rare earth metal-based permanent magnet having a multilayered plating film was produced in the same manner as in Example 1 except for changing the film thickness of the SnCu alloy plating film to 0.05 μm.

Comparative Example 4

A rare earth metal-based permanent magnet having a multilayered plating film was produced in the same manner as in Example 1 except for adjusting the composition of the SnCu alloy plating solution to obtain a coating film having a composition of Cu:Sn=80:20 mass %. Rust prevention treatment using benzotriazole was applied to prevent the discoloration attributed to the high Cu ratio.

Comparative Example 5

A rare earth metal-based permanent magnet having a multilayered plating film was produced in the same manner as in Example 1 except for adjusting the composition of the SnCu alloy plating solution to obtain a coating film having a composition of Cu:Sn=67:33 mass %. Since the film thus obtained exhibited brass color due to the high Cu content, rust prevention treatment using benzotriazole was applied after washing with 10 vol % of sulfuric acid and rinsing with water.

Comparative Example 6

A rare earth metal-based permanent magnet having a multilayered plating film was produced in the same manner as in Example 1 except for adjusting the composition of the SnCu alloy plating solution to obtain a coating film having a composition of Cu:Sn=40:60 mass %.

Comparative Example 7

A rare earth metal-based permanent magnet having a multilayered plating film was produced in the same manner as in Example 1 except for adjusting the composition of the SnCu alloy plating solution to obtain a coating film having a composition of Cu:Sn=30:70 mass %.

Comparative Example 8

A rare earth metal-based permanent magnet having a multilayered plating film was produced in the same manner as in Example 1 except for adjusting the composition of the SnCu alloy plating solution to obtain a coating film having a composition of Cu:Sn=10:90 mass %.

Comparative Example 9

A rare earth metal-based permanent magnet having a N—Cu—Ni three-layered plating film was produced in the same manner as in Example 1, subjected to washing with 10 vol % of sulfuric acid and rinsing with water, and was further subjected to washing with 10 mass % of caustic soda, followed by rinsing with water and drying.

Comparative Example 10

A N—Cu—Ni three-layered plating film was formed in the same manner as in Example 1, followed by immersion in 3 g/L of oxalic acid solution (20° C.) for 3 minutes, rinsing with water, and drying.

Comparative Example 11

A rare earth metal-based permanent magnet having a N—Cu two-layered plating film was produced by applying the pretreatment in the same manner as in Example 1 to the same sintered magnet body used in Example 1, forming the first Ni plating film layer in the same manner as in Example 1, and forming the second Cu plating film layer in the same manner as in Example 1 except for changing the film thickness to 12 μm.

Subsequently, rust prevention treatment using benzotriazole was applied after washing with 10 vol % of sulfuric acid and rinsing with water.

Comparative Example 12

A N—Cu—Ni three-layered plating film was formed in the same manner as in Example 1.

Subsequently, a Cu—Ni alloy plating film having a film thickness of 2 μm was formed by using a plating solution containing nickel sulfate, copper sulfate, and additives such as a pH controller, and a brightening agent. The composition of the resulting coating film was Ni: 28 mass % (balance Cu).

Comparative Example 13

A N—Cu—Ni three-layered plating film was formed in the same manner as in Example 1.

Subsequently, a Cu—Fe alloy plating film having a film thickness of 2 μm was formed by using a plating solution containing cuprous cyanide, ferric ferrocyanide, and Rochelle salt, and adjusting a pH. The composition of the resulting coating film was Fe: 13 mass % (balance Cu).

<Adhesion Test>

The magnets produced in Example 1 to Example 17, Reference Example, and Comparative Example 1 to Comparative Example 13 were each adhered to a yoke made of SUS 304 using a silicone-based adhesive (SE 1750; an addition reaction type silicone-based adhesive produced by Dow Corning Toray Co., Ltd.) to obtain joined structures. The hardening was carried out at 150° C. for 90 minutes (the temperature of the magnet was measured using a contact type thermometer), and 10 joined structures were fabricated per one condition. Among them, a compression shear strength was measured on 5 joined structures just after the adhesion, whereas the remaining 5 joined structures were subjected to a moisture resistance test under high temperature and high humidity conditions of 80° C.×90%×24 hours, and then a compression shear strength was measured (the compression shear strength was measured after all the joined structures were cooled to room temperature). The compression shear strength was measured using TOYO BALDWIN (TENSILON UTM-I-5000C). The compression speed was set at 1.5 mm/min. Furthermore, visual inspections were made on the state of the adhesive remaining on the separated surface after the test, and on whether a handling flaw during the test had been generated or not. The test results are given in Table 1 and Table 2. In the Tables, the each adhesion strength (compression shear strength) is given by the average of 5 measured values.

The magnets of Example 1 to Example 17 and of Reference Example showed favorable adhesion strengths just after the adhesion and after subjecting to the moisture resistance test, and the spalling mode of the adhesives were all found to be entire cohesion failure. Thus, the rare earth metal-based permanent magnet of the present invention was found to give low deterioration of adhesion strength even after being subjected to a moisture resistance test after adhered with other member using an adhesive. Furthermore, after the test, it was found that no flaws had been generated on the other part which was subjected to the test (that other than the adhesion plane).

The magnets of Comparative Examples 1 and 2 were found to each have a highly brittle coating film, and the each SnCu alloy plating film was destroyed to cause partial spalling of the SnCu alloy plating film just after the adhesion and after subjecting to the moisture resistance test.

The magnet of Comparative Example 3 exhibited high adhesion strength just after the adhesion, and the spalling mode of the adhesive was found to be entire cohesion failure; however, after subjecting to the moisture resistance test, interfacial spalling was found to occur on the magnet side and the adhesion strength was deteriorated. Accordingly, it was found that no effect of improving adhesion properties is obtained by the SnCu alloy plating film having a film thickness of 0.05 μm.

The magnets of Comparative Examples 4 and 5 each exhibited high adhesion strength just after the adhesion, and the spalling mode of the adhesive was found to be entire cohesion failure; however, after subjecting to the moisture resistance test, the adhesion strength was deteriorated abruptly and interfacial spalling was found to occur, in which no adhesive was found to remain on the surface of the magnet.

The magnets of Comparative Examples 6, 7, and 8 were each found to have no problem in the adhesion properties, but flaws generated due to the handling of adhesion and the like. Such flaws impair the product value of the rare earth metal-based permanent magnet by, for instance, causing breakage of the plating film and decrease of dimensional precision and the like, and result in handling in mass production to be complicated.

The magnets of Comparative Examples 9, 10, and 11 each exhibited high adhesion strength just after the adhesion, and the spalling mode of the adhesive was found to be entire cohesion failure; however, after subjecting to the moisture resistance test, the adhesion strength was deteriorated and interfacial spalling was found to occur, in which no adhesive was found to remain on the magnet side.

The magnets of Comparative Examples 12 and 13 each exhibited relatively high adhesion strength just after the adhesion, and the spalling mode of the adhesive was found to be entire cohesion failure; however, after subjecting to the moisture resistance test, interfacial spalling of the adhesive was found to occur on the magnet side and the adhesion strength was deteriorated.

From the above results, it has been found that the adhesion properties after subjecting to the moisture resistance test is not deteriorated only in a particular combination of a SnCu alloy plating film and a base coating film.

TABLE 1

| | Conditions of Plating Film | | | | Just After Adhesion | | After Moisture Resistance Test (80° C. × 90% × 24 hrs) | | |
|---|---|---|---|---|---|---|---|---|---|
| | Film Constitution | Sn (mass %) | SnCu film thickness µm | Post Treatment | Adhesion Strength MPa | Spalling Mode | Adhesion Strength MPa | Spalling Mode | Generation of Handling Flaws |
| Example 1 | Ni—Cu—Ni | 45 | 1 | None | 5.1 | adhesive entire cohesion failure | 4.9 | adhesive entire cohesion failure | None |
| Example 2 | Ni—Cu—Ni | 45 | 0.1 | None | 5.2 | adhesive entire cohesion failure | 5.0 | adhesive entire cohesion failure | None |
| Example 3 | Ni—Cu—Ni | 45 | 0.2 | None | 4.9 | adhesive entire cohesion failure | 4.7 | adhesive entire cohesion failure | None |
| Example 4 | Ni—Cu—Ni | 45 | 2 | None | 4.7 | adhesive entire cohesion failure | 4.6 | adhesive entire cohesion failure | None |
| Example 5 | Ni—Cu—Ni | 45 | 0.1 | None | 5.2 | adhesive entire cohesion failure | 5.0 | adhesive entire cohesion failure | None |
| Example 6 | Ni—Cu—Ni | 45 | 0.2 | None | 4.9 | adhesive entire cohesion failure | 4.8 | adhesive entire cohesion failure | None |
| Example 7 | Ni—Cu—Ni | 45 | 2 | None | 5.0 | adhesive entire cohesion failure | 4.9 | adhesive entire cohesion failure | None |
| Example 8 | Ni—Cu—Ni | 45 | 1 | trisodium phosphate | 5.2 | adhesive entire cohesion failure | 4.7 | adhesive entire cohesion failure | None |
| Example 9 | Ni—Cu—Ni | 35 | 1 | None | 4.8 | adhesive entire cohesion failure | 4.7 | adhesive entire cohesion failure | None |
| Example 10 | Ni—Cu—Ni | 40 | 1 | None | 5.0 | adhesive entire cohesion failure | 4.9 | adhesive entire cohesion failure | None |
| Example 11 | Ni—Cu—Ni | 50 | 1 | None | 5.4 | adhesive entire cohesion failure | 5.2 | adhesive entire cohesion failure | None |
| Example 12 | Ni—Cu—Ni | 53 | 1 | None | 5.2 | adhesive entire cohesion failure | 4.7 | adhesive entire cohesion failure | None |
| Example 13 | Ni—Cu—Ni | 54 | 1 | None | 4.8 | adhesive entire cohesion failure | 4.6 | adhesive entire cohesion failure | None |
| Example 14 | Ni—Cu—Ni (sulfuric acid) | 45 | 1 | None | 5.3 | adhesive entire cohesion failure | 5.1 | adhesive entire cohesion failure | None |
| Example 15 | Ni—Cu—Ni (hydrochloric acid) | 45 | 1 | None | 5.5 | adhesive entire cohesion failure | 5.1 | adhesive entire cohesion failure | None |
| Example 16 | Ni—Cu—Ni (polyphosphoric acid) | 45 | 1 | None | 5.0 | adhesive entire cohesion failure | 4.9 | adhesive entire cohesion failure | None |
| Example 17 | Cu—Ni | 45 | 1 | None | 5.2 | adhesive entire cohesion failure | 5.0 | adhesive entire cohesion failure | None |
| Reference Example | Ni—Cu | 45 | 1 | None | 5.5 | adhesive entire cohesion failure | 5.0 | adhesive entire cohesion failure | None |

TABLE 2

| | Conditions of Plating Film | | | | Just After Adhesion | | After Moisture Resistance Test (80° C. × 90% × 24 hrs) | | |
|---|---|---|---|---|---|---|---|---|---|
| | Film Constitution | Sn (mass %) | SnCu film thickness µm | Post Treatment | Adhesion Strength MPa | Spalling Mode | Adhesion Strength MPa | Spalling Mode | Generation of Handling Flaws |
| Comparative Example 1 | Ni—Cu—Ni | 45 | 4 | None | 4.0 | partial film spalling | 3.7 | partial film spalling | None |
| Comparative Example 2 | Ni—Cu—Ni | 45 | 3.5 | None | 4.3 | partial film spalling | 3.9 | partial film spalling | None |

TABLE 2-continued

| | Conditions of Plating Film | | | | Just After Adhesion | | After Moisture Resistance Test (80° C. × 90% × 24 hrs) | | |
|---|---|---|---|---|---|---|---|---|---|
| | Film Constitution | Sn (mass %) | SnCu film thickness μm | Post Treatment | Adhesion Strength MPa | Spalling Mode | Adhesion Strength MPa | Spalling Mode | Generation of Handling Flaws |
| Comparative Example 3 | Ni—Cu—Ni | 45 | 0.05 | None | 5.0 | adhesive entire cohesion failure | 3.0 | magnet side interfacial spalling | None |
| Comparative Example 4 | Ni—Cu—Ni | 20 | 1 | benzotriazole | 5.1 | adhesive entire cohesion failure | 1.3 | magnet side interfacial spalling | None |
| Comparative Example 5 | Ni—Cu—Ni | 33 | 1 | benzotriazole | 4.6 | adhesive entire cohesion failure | 2.5 | magnet side interfacial spalling | None |
| Comparative Example 6 | Ni—Cu—Ni | 60 | 1 | None | 5.0 | adhesive entire cohesion failure | 4.0 | adhesive entire cohesion failure | fine flaws |
| Comparative Example 7 | Ni—Cu—Ni | 70 | 1 | None | 5.3 | adhesive entire cohesion failure | 4.7 | adhesive entire cohesion failure | flaws |
| Comparative Example 8 | Ni—Cu—Ni | 90 | 1 | None | 5.2 | adhesive entire cohesion failure | 4.5 | adhesive entire cohesion failure | flaws |
| Comparative Example 9 | Ni—Cu—Ni | 0 | 0 | sulfuric acid + caustic soda | 4.7 | adhesive entire cohesion failure | 1.5 | magnet side interfacial spalling | None |
| Comparative Example 10 | Ni—Cu—Ni | 0 | 0 | oxalic acid | 4.7 | adhesive entire cohesion failure | 1.2 | magnet side interfacial spalling | None |
| Comparative Example 11 | Ni—Cu | 0 | 0 | benzotiazole | 5.0 | adhesive entire cohesion failure | 1.5 | magnet side interfacial spalling | None |
| Comparative Example 12 | Ni—Cu—Ni | 2 μm thick film of Cu—Ni alloy plating film containing 28 mass % of Ni. No post treatment | | | 4.5 | adhesive entire cohesion failure | 2.5 | magnet side interfacial spalling | None |
| Comparative Example 13 | Ni—Cu—Ni | 2 μm thick film of Cu—Fe alloy plating film containing 20 mass % of Fe. No post treatment | | | 4.8 | adhesive entire cohesion failure | 1.8 | magnet side interfacial spalling | None |

Example 18

A radial oriented Nd—Dy—Fe—Al—B based ring-shaped sintered magnet body comprising $(Nd,Dy)_2(Fe)_{14}B$-type intermetallic compound as the main phase was produced by a known method. This permanent magnet body yielded magnetic characteristics at room temperature of $B_r$=1.2 T (12 kG), $H_{cJ}$=1989 kA/m (25 kOe), and $(BH)_{max}$=280 kJ/m$^3$ (35 MGOe). The ring-shaped sintered magnet body was processed to obtain a magnet raw material having an outer diameter of 40 mm, an inner diameter of 33 mm, and a height of 13.5 mm. After immersing it in a rust preventive agent and drying, plating was applied under the same conditions as in Example 1 to obtain the ring-shaped sintered magnet body of the present invention having a SnCu alloy plating film having a film thickness of 1 μm on the upper layer of a N—Cu—Ni three-layered plating film (the film thicknesses of the each layers are the same as those of Example 1). The film thickness of the SnCu alloy plating film was measured on the inner diameter part of the magnet.

10 joined structures of the present invention were fabricated by adhering a yoke for measuring adhesion strength made of SUS 304 and having a diameter of 32.9 mm to the inner diameter part of each ring-shaped sintered magnet bodies of the present invention having the SnCu alloy plating film as the outermost surface layer. A silicone-based adhesive (SE 1750, produced by Dow Corning Toray Co., Ltd.) was used as an adhesive, and the thermal hardening was carried out at 150° C. for 90 minutes.

Comparative Example 14

Joined structures were fabricated in the same manner as in Example 18 except for using a thermosetting type epoxy-based adhesive as an adhesive, and by thermally hardening it at 150° C. for 90 minutes.

<Evaluation Test>

On visually inspecting each of the joined structures after hardening, no cracks were observed on the ring-shaped sintered magnet body of Example 18, however, cracks were observed on the magnet body of Comparative Example 14 due to the difference in linear expansion coefficients. The visually inspected results are given in Table 3.

A compression shear strength just after the adhesion was measured on 5 joined structures among the joined structures fabricated in Example 18. The remaining 5 joined structures were subjected to a moisture resistance test under high temperature and high humidity conditions of 80° C.×90%×24 hrs, and then a compression shear strength was measured. The compression shear strength was measured using TOYO BALDWIN (TENSILON UTM-I-5000C). The compression speed was set at 1.5 mm/min. Furthermore, the state of the adhesive remaining on the separated surface after the test was observed.

Figure 2:
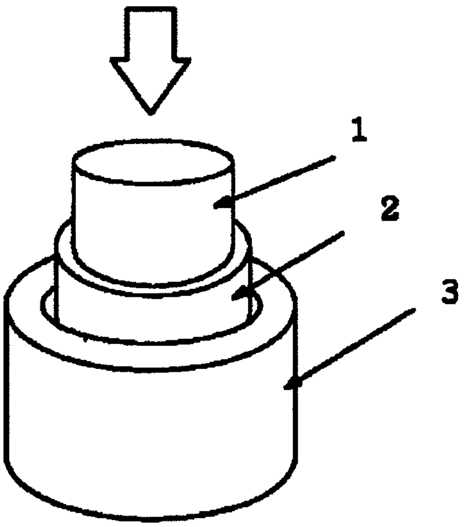
FIG. 2 It is an explanatory perspective view showing the case that a compression shear strength is measured.

The compression shear strength was measured by mounting the joined structure comprising the ring-shaped sintered magnet body 2 and the yoke 1 for measuring adhesion strength on a jig 3 for measuring adhesion strength as shown in FIG. 1 which fixes the ring-shaped sintered magnet body alone, and then by applying a predetermined pressure along the direction shown by the outline arrow as shown in FIG. 2. As a result, it has been found that the deterioration in adhesion strength was small even after the moisture resistance test, and that the separated surface showed a cohesive failure plane of the adhesive. In the Table, the each adhesion strength (compression shear strength) is given by the average of 5 measured values.

TABLE 3

| | Just After Adhesion | | After Moisture Resistance Test (80° C. × 90% × 24 hrs) | | |
|---|---|---|---|---|---|
| | Adhesion Strength MPa | Spalling Mode | Adhesion Strength MPa | Spalling Mode | Presence of Cracks on Magnet |
| Example 18 | 5.3 | adhesive entire cohesion failure | 4.8 | adhesive entire cohesion failure | No |
| Comparative Example 14 | — | — | — | — | Yes |

Furthermore, 5 more joined structures were fabricated in the same manner as in Example 18, which were subjected to a moisture resistance test under conditions of 80° C.×90%×1000 hrs, and the compression shear strength was measured in the same manner as described above.

The adhesion strength (the average of 5 measured compression shear strength values) of the joined structures subjected to the above moisture resistance test was 4.3 MPa, which was only slightly lower than the adhesion strength 4.8 MPa obtained on the sample after moisture resistance test (80° C.×90%×24 hrs) performed in Example 18. On further confirming the spalling mode of the adhesive remaining on the separated surface, cohesion failure of the adhesive was found to occur on all of the samples.

Furthermore, excellent corrosion resistance was observed on the rare earth metal-based permanent magnet after the above moisture resistance test, with no spalling of the plating film, no blistering of the plating film, and the like.

Example 19

The ring-shaped sintered magnet body of the present invention having a SnCu alloy plating film as the outermost surface layer, which was produced in Example 18, was subjected to a moisture resistance test under conditions of 30° C.×70%×500 hrs, and 10 joined structures of the present invention were fabricated by adhering a yoke for measuring adhesion strength made of SUS 304 and having a diameter of 32.9 mm to the inner diameter part of each ring-shaped sintered magnet bodies. A silicone-based adhesive (SE 1750, produced by Dow Corning Toray Co., Ltd.) was used as an adhesive, and the thermal hardening was carried out at 150° C. for 90 minutes.

The conditions of 30° C.×70% adopted for the moisture resistance test were determined by taking into consideration the average temperature and the average humidity (25.4° C. and 70.6%) during June to August in year 2004 to 2006 in Kumagaya-city, Saitama Prefecture, Japan.

Figure 3:
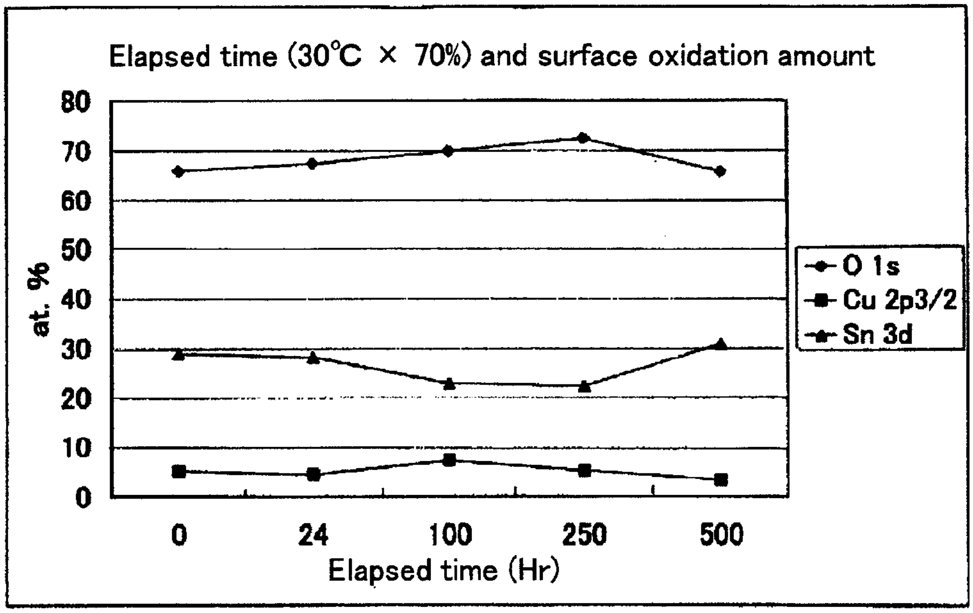
FIG. 3 It is a graph showing a change in surface oxidation of a SnCu alloy plating film shown in Example 19.

The change in surface oxidation of the SnCu alloy plating with elapse of time was observed from 0 hours to 500 hours by carrying out surface analysis using XPS (ESCA-850, manufactured by Shimadzu Corporation) at time elapse of 0 hours, 24 hours, 250 hours, and 500 hours. The results are shown in FIG. 3. FIG. 3 clearly shows that no surface oxidation proceeded from 0 hours to 500 hours.

Furthermore, a compression shear strength was measured on 5 joined structures after the adhesion, and on 5 joined structures after subjecting to a moisture resistance test under conditions of 80° C.×90%×24 hours.

The shear strength was given by the average of 5 measured values.

As a result, the shear strength after the adhesion was 4.9 MPa. The shear strength after the moisture resistance test was 4.8 MPa, which remained almost the same with no deterioration in the shear strength. Upon visual observation, the separated surface was found to be entire cohesion failure of the adhesive for both cases, after the adhesion and after the moisture resistance test.

The results above can be interpreted due to the stable oxidation resistance of the ring-shaped sintered magnet body having a SnCu alloy plating film as the outermost surface layer of the present invention, which prevents deterioration from occurring on the adhesion strength when exposed to corrosive environment.

Example 20

The ring-shaped sintered magnet body of the present invention having a SnCu alloy plating film as the outermost surface layer, which was produced in Example 18, was subjected to a moisture resistance test under conditions of 80° C.×90%×24 hrs, and 10 joined structures of the present invention were fabricated by adhering a yoke for measuring adhesion strength made of SUS 304 and having a diameter of 32.9 mm to the inner diameter part of each ring-shaped sintered magnet bodies. A silicone-based adhesive (SE 1750, produced by Dow Corning Toray Co., Ltd.) was used as an adhesive, and the thermal hardening was carried out at 150° C. for 90 minutes.

A compression shear strength was measured on 5 joined structures after the adhesion, and on 5 joined structures after subjecting to a moisture resistance test under conditions of 80° C.×90%×24 hours.

The shear strength was given by the average of 5 measured values.

As a result, the shear strength after the adhesion was 5.0 MPa. The shear strength after the moisture resistance test was 4.9 MPa, which remained almost the same with no deterioration in the shear strength. Upon visual observation, the separated surface was found to be entire cohesion failure of the adhesive for both cases, after the adhesion and after the moisture resistance test.

Example 21

A radial oriented Nd—Dy—Fe—Al—B based ring-shaped sintered magnet body comprising $(Nd,Dy)_2(Fe)_{14}B$-type intermetallic compound as the main phase was produced by a known method. This permanent magnet body yielded magnetic characteristics at room temperature of $B_r$=1.2 T (12 kG), $H_{cJ}$=1989 kA/m (25 kOe), and $(BH)_{max}$=280 kJ/$m^3$ (35

MGOe). The ring-shaped sintered magnet body was processed to obtain a magnet raw material having an outer diameter of 40 mm, an inner diameter of 33 mm, and a height of 13.5 mm. After immersing it in a rust preventive agent and drying, plating was applied thereto.

In the case the rare earth metal-based permanent magnet to be plated is ring-shaped, the electric current tends to concentrate on the outer diameter part of the ring. This tendency becomes more prominent as the length along the axial direction with respect to the diameter of the ring-shaped magnet increases, and the film thickness of the plating film that is formed on the inner diameter part tends to be thinner.

In Example 21, to assure a film thickness at the inner diameter part of the ring-shaped sintered magnet, the apparatus disclosed in JP-A-2001-73198 was used to apply plating sequentially under the same conditions as in Example 1. Plural apparatuses were set, and plating solutions were each prepared. The raw magnet bodies to be plated were transported from an apparatus to another in wet state. The film thickness of the SnCu alloy plaing film was measured on the inner diameter part, and was found to be 1 μm. The composition was found to be Cu:Sn=55:45 mass %.

10 joined structures of the present invention were fabricated by adhering a yoke for measuring adhesion strength made of SUS 304 and having a diameter of 32.9 mm to the inner diameter part of each ring-shaped sintered magnet bodies above. A silicone-based adhesive (SE 1750, produced by Dow Corning Toray Co., Ltd.) was used as an adhesive, and the thermal hardening was carried out at 150° C. for 90 minutes.

On visually inspecting each of the joined structures after hardening, no cracks were observed on the ring-shaped sintered magnet body.

A compression shear strength just after the adhesion was measured on 5 joined structures among the joined structures fabricated above. The remaining 5 joined structures were subjected to a moisture resistance test under high temperature and high humidity conditions of 80° C.×90%×24 hrs, and then a compression shear strength was measured. The compression shear strength was measured using TOYO BALDWIN (TENSILON UTM-I-5000C). The compression speed was set at 1.5 mm/min. Furthermore, the state of the adhesive remaining on the separated surface after the test was observed.

The compression shear strength was measured by mounting the joined structure comprising the ring-shaped sintered magnet body 2 and the yoke 1 for measuring adhesion strength on a jig 3 for measuring adhesion strength as shown in FIG. 1 which fixes the ring-shaped sintered magnet body alone, and then by applying a predetermined pressure along the direction shown by the outline arrow as shown in FIG. 2. As a result, the shear strength before the moisture resistance test was 5.2 MPa. The shear strength after the moisture resistance test was 5.0 MPa. It has been found that the deterioration in adhesion strength was small even after the above moisture resistance test, and that the separated surface showed a cohesive failure plane of the adhesive. The each adhesion strength (compression shear strength) is given by the average of 5 measured values.

The method disclosed in JP-A-2001-73198 comprises setting an anode also to the inner diameter part of a ring-shaped magnet, thereby controlling positively the ratio in film thickness of the plating film at the inner diameter side and that at the outer diameter side, and is applicable to a ring-shaped magnet that is long in the axial direction with respect to the diameter. Thus, by combining this method with the method of the present invention, it is possible to assure the adhesion properties.

INDUSTRIAL APPLICABILITY

The present invention has a large industrial applicability in the point that it provides a rare earth metal-based permanent magnet having thereon a plating film which shows less deterioration in adhesion strength even after being adhered with other member using an adhesive and subjected to a moisture resistance test; in particular, in the point that a joined structure having an adhesion improvement effect reliable for a long term is obtained free from cracks at the time of the adhesion, even when a ring-shaped magnet is adhered with other member using a silicone-based adhesive.

The invention claimed is:

1. A rare earth metal-based permanent magnet having a laminated plating film, characterized in that the plating film comprises as an outermost surface layer a SnCu alloy plating film having a film thickness in a range from 0.1 μm to 2 μm, the composition of the SnCu alloy plating film is 35 mass % or more but less than 55 mass % of Sn and the rest being Cu, and a base plating film having two or more layers including at least a Ni plating film and a Cu plating film which are formed as the lower layer under the SnCu alloy plating film, and among the base plating film, the Ni plating film is located just below the SnCu alloy plating film.

2. The rare earth metal-based permanent magnet as claimed in claim 1, wherein the film thickness of the Cu plating film provided as one of the base plating films is in a range from 3 μm to 17 μm.

3. The rare earth metal-based permanent magnet as claimed in claim 1, wherein the film thickness of the Ni plating film provided as one of the base plating films is in a range from 2 μm to 8 μm.

4. The rare earth metal-based permanent magnet as claimed in claim 1, characterized in that a chemical conversion treatment film is further provided on the SnCu alloy plating film.

5. The rare earth metal-based permanent magnet as claimed in claim 1, characterized in that the rare earth metal-based permanent magnet is ring-shaped.

6. A joined structure obtained by joining a rare earth metal-based permanent magnet as claimed in claim 1 with other member via a silicone-based adhesive.

* * * * *